(12) United States Patent
Ruch et al.

(10) Patent No.: US 7,517,369 B2
(45) Date of Patent: Apr. 14, 2009

(54) DYES THAT ARE SOLUBLE IN ORGANIC SOLVENTS

(75) Inventors: Thomas Ruch, Delémont (CH); Ursula Luterbacher, Reinach (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 158 days.

(21) Appl. No.: 11/794,132

(22) PCT Filed: Dec. 19, 2005

(86) PCT No.: PCT/EP2005/056892

§ 371 (c)(1),
(2), (4) Date: Jun. 25, 2007

(87) PCT Pub. No.: WO2006/069929

PCT Pub. Date: Jul. 6, 2006

(65) Prior Publication Data

US 2008/0184497 A1    Aug. 7, 2008

(30) Foreign Application Priority Data

Dec. 29, 2004 (EP) .................................. 04107050

(51) Int. Cl.
*D06P 1/06* (2006.01)
*C07C 243/10* (2006.01)

(52) U.S. Cl. ........................ 8/466; 8/492; 8/506; 8/532; 8/533; 8/587; 8/588; 8/620; 8/641; 534/550

(58) Field of Classification Search .................. 8/466, 8/492, 506, 532, 533, 587, 588, 620, 64, 8/1

See application file for complete search history.

(56) References Cited

U.S. PATENT DOCUMENTS 3,915,952 A    10/1975   Sailer et al. .................. 260/169
3,943,122 A    3/1976    Sailer et al. .................. 260/169

FOREIGN PATENT DOCUMENTS

| DE | 2 203 614 | 8/1972 |
| GB | 445378 | 4/1936 |
| GB | 932024 | 7/1963 |
| GB | 1073839 | 6/1967 |
| JP | 58173171 | 10/1983 |

OTHER PUBLICATIONS

STIC Search Report dated Jan. 17, 2009.*
English Language abstract of JP 58173171 printed from the esp@cenet web site on Aug. 24, 2007.

* cited by examiner

*Primary Examiner*—Eisa B Elhilo
(74) *Attorney, Agent, or Firm*—Joseph C. Suhadolnik

(57) ABSTRACT

The present invention relates to dyes of formula (1) that are soluble in organic solvents, wherein $Cat^+$ is an organic cation, to a process for their preparation and to their use in the production of colored plastics or polymeric color particles, printing colorants, printing pastes and printing inks.

17 Claims, No Drawings

DYES THAT ARE SOLUBLE IN ORGANIC SOLVENTS

The present invention relates to azo-compound-based dyes that are soluble in organic solvents, to a process for their preparation and to their use in the production of coloured plastics or polymeric colour particles and also as printing inks and printing colorants, coating compositions and wood stains.

The object of the present invention is to provide heavy-metal-free dyes that are very soluble in organic solvents, having good solubility, high colour strength and good fastness to light, can be used, for example, as soluble printing dyes and wood stains and in the colouring of polar plastics, and are only sparingly soluble in water. This cannot be achieved using the heavy-metal-free compounds known today.

It has now been found, surprisingly, that the dyes according to the invention, which are in the form of specific organic salts, achieve the above-mentioned object to a substantial degree.

The present invention accordingly relates to dyes of formula

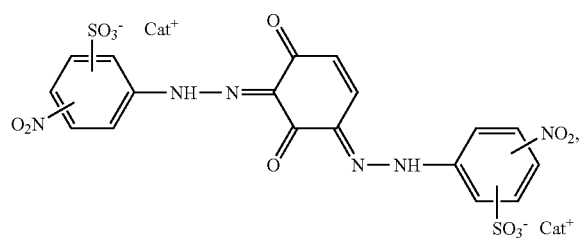

(1)

wherein

Cat$^+$ is an organic cation.

The organic cation Cat+ is, for example, 18-crown-6 Na$^+$ (a compound of formula

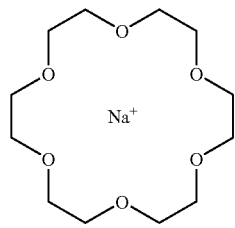

) or N($R_5$,$R_6$,$R_7$,$R_8$), wherein $R_5$ to $R_8$ are each independently of the others hydrogen, $C_1$-$C_{16}$alkyl or $C_1$-$C_4$alcohol.

Cat$^+$ is preferably the ammonium cation

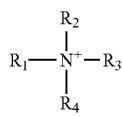

of an amine of formula

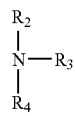

or of an ammonium compound of formula

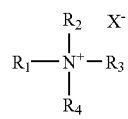

wherein $R_1$, $R_2$, $R_3$ and $R_4$ are each independently of the others hydrogen or linear or branched $C_2$-$C_{14}$alkyl unsubstituted or hydroxy- or amino-substituted, and optionally interrupted by an oxygen atom, at least one of the substituents $R_1$ to $R_4$ being linear or branched $C_2$-$C_{14}$alkyl unsubstituted or hydroxy- or amino-substituted, and optionally interrupted by an oxygen atom, and X is halogen or —OH.

As Cat$^+$ there is especially preferred a cation derived from Primene81R®, a commercial product of Rohm & Haas, a primary amine mixture with a heavily branched $C_{12}$-$C_{14}$alkyl side chain, or from $C_1$-$C_{14}$tetraalkylammonium hydroxide, especially tetrabutylammonium hydroxide.

The cations Cat$^+$ may also be in the form of mixtures.

Cat$^+$ is more especially +N(CH$_2$CH$_2$CH$_2$CH$_3$)$_4$.

Preference is likewise given to dyes of formula (1) wherein Cat$^+$ is an organic cation containing at least one branched radical.

In the context of the present invention, an organic cation Cat$^+$ containing at least one branched radical is understood to mean, for example, a primary amine having a branched $C_3$-$C_{14}$alkyl chain or a secondary, tertiary or quaternary amine having at least one linear or branched $C_3$-$C_{14}$alkyl chain.

The dyes of formula (1) can be prepared according to methods known per se. They are obtained, for example, by salt conversion of the dye of formula

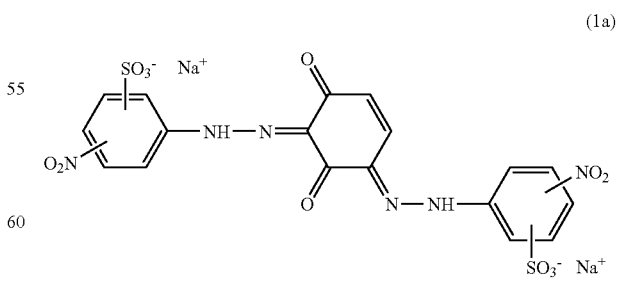

(1a)

in an organic solvent/water medium, using an organic ammonium compound containing the cation Cat+, to form the dye of formula

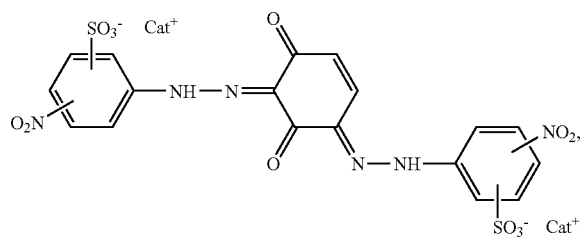

(1)

Cat⁺ having the definition and preferred meanings given above.

Solvents in that case can be polar organic solvents, such as, for example, alcohols, amides, ketones, carboxylates, such as ethyl acetate, chlorinated hydrocarbons, such as $CH_2Cl_2$ or $CHCl_3$, hydrocarbons, for example hexane, heptane, toluene or xylene, or also amines. The reaction temperature can generally be from room temperature (about 20° C.) to the boiling point of the solvent employed.

The compounds of formula (1a) are known or can be prepared in a manner known per se.

The organic solvents in which the dyes according to the invention are soluble are, for example, linear, branched or cyclic alcohols, linear, branched or cyclic ketones, carboxylates, toluene, xylene and chlorinated hydrocarbons, such as, for example, $CH_2Cl_2$ or $CHCl_3$.

The dyes according to the invention have especially good solubility in polar solvents, especially in methanol, ethanol, ethyl acetate, butyl acetate, methyl ethyl ketone and isobutyl methyl ketone.

The present invention relates also to a process for the production of coloured plastics or polymeric colour particles, which comprises blending with one another a high molecular weight organic material and a tinctorially effective amount of at least one dye of formula (1).

The colouring of high molecular weight, organic substances using the dye of formula (1) is effected, for example, by admixing such a dye with such substrates using roll mills or mixing or grinding apparatuses, with the result that the dye is dissolved or finely distributed in the high molecular weight material. The high molecular weight organic material with the admixed dye is then processed according to methods known per se, such as, for example, calendering, compression moulding, extrusion, coating, spinning, pouring or injection moulding, whereby the coloured material acquires its final shape. Admixture of the dye can also be effected immediately prior to the actual processing step, for example by continuously simultaneously feeding pulverulent dye and a granulated or pulverulent high molecular weight organic material and, optionally, also additional ingredients, such as additives, directly into the intake zone of an extruder, the constituents being mixed just prior to processing. Generally, however, preference is given to mixing the dye into the high molecular weight organic material beforehand, because more evenly coloured substrates can be obtained.

In order to produce non-rigid mouldings or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the process according to the invention, the plasticisers can be incorporated into the polymers before or after the incorporation of the colorant. It is also possible, in addition to adding the dye of formula (1) to the high molecular weight organic materials, to add further dyes or other colorants in desired amounts in order to achieve different colour shades, optionally together with further additives, for example fillers or siccatives.

Preference is given to the dyeing of thermoplastic plastics, especially in the form of fibres or films.

Preferred high molecular weight organic materials that can be coloured in accordance with the invention are, very generally, polymers having a dielectric constant ≧2.5, especially polyesters, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Especially preferred are polyesters and polyamide. More especially preferred are linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); also polycarbonates, e.g. those obtained from α,α-dimethyl-4,4-dihydroxy-diphenylmethane and phosgene, or polymers based on polyvinyl chloride and on polyamide, e.g. polyamide-6 or polyamide-6.6.

The dyes according to the invention impart to the above-mentioned materials, especially the polyester and polyamide materials, shades of strong colour having very good in-use fastness properties, especially a good fastness to light.

The dyes of formula (1) according to the invention can also be used in the printing of semi-synthetic and, especially, synthetic hydrophobic fibre materials, more especially textile materials, and also in the printing of paper, plastics films or metal foils, especially aluminium foils.

Semi-synthetic textile materials that come into consideration are especially cellulose 2½ acetate and cellulose triacetate.

Synthetic hydrophobic textile materials consist especially of linear, aromatic polyesters, for example polyesters of terephthalic acid and glycols, especially ethylene glycol, or condensation products of terephthalic acid and 1,4-bis(hydroxymethyl)cyclohexane; of polycarbonates, e.g. polycarbonates obtained from α,α-dimethyl-4,4'-dihydroxy-diphenyl-methane and phosgene, and of fibres based on polyvinyl chloride and on polyamide.

The dyes according to the invention are also highly suitable for the printing of polyester/wool and polyester/cellulosic fibre blends.

The said textile material can be in a variety of processing forms, e.g. in the form of fibres, yarns or non-wovens, in the form of woven fabrics or knitted fabrics.

It is advantageous to convert the dyes according to the invention into a dye preparation prior to use. For that purpose, the dye is so ground that its particle size is on average from 0.1 to 10 microns. Grinding can be carried out in the presence of dispersants. For example, the dried dye is ground with a dispersant or is kneaded into paste form with a dispersant and then dried in vacuo or by atomisation. The preparations so obtained can be used, after the addition of water, to prepare printing colorants or printing pastes.

The present invention relates also to the use of the dyes according to the invention in the preparation of printing colorants or printing pastes, optionally also together with other dyes, as well as to the printing colorants or printing pastes obtained.

The amount of dyes to be added to the printing colorants or printing pastes is dependent on the desired colour strength; in general, amounts of from 0.01 to 15% by weight, especially from 0.02 to 10% by weight, based on the material to be printed, have proved suitable.

For printing, the customary thickeners will be used, e.g. modified or unmodified natural products, for example alginates, British gum, gum arabic, crystal gum, carob flour, tragacanth, carboxymethyl cellulose, hydroxyethyl cellulose, starch or synthetic products, for example polyacrylamides, polyacrylic acid or copolymers thereof, or polyvinyl alcohols.

The printing pastes also comprise, if desired, acid donors, such as butyrolactone or sodium hydrogen phosphate, preservatives, sequestering agents, emulsifiers, organic solvents, e.g. alcohols, esters, toluene and xylene, binders, e.g. nitrocellulose and vinyl copolymers, softeners, e.g. citric acid, oxidising agents, deaerating agents, light stabilisers and UV stabilisers.

For printing, the printing paste is applied directly to the entire surface of the material to be printed or to parts thereof, printing machines of the customary type, e.g. flexographic/intaglio printing, offset printing, rotary or flat-film printing machines, advantageously being used. The printing pastes according to the invention are also suitable for transfer printing.

The dyes according to the invention impart to the mentioned materials, especially to polyester materials, level colour shades having very good in-use fastness properties.

The present invention relates also to the use of the dyes of formula (1) in the preparation of printing inks, preferably inks used in an ink-jet method.

The present invention relates also to the aqueous inks used in the ink-jet printing method that comprise at least one dye of formula (1).

The total amount of dyes present in the inks is preferably from 0.5 to 35% by weight, especially from 1 to 30% by weight and more especially from 1 to 20% by weight, based on the total weight of the ink. The especially preferred lower limit is 1.2% by weight, especially 1.5% by weight. The especially preferred upper limit is 15% by weight, especially 10% by weight.

The inks preferably comprise a solubiliser or a humectant, such as a water-miscible organic solvent, for example a $C_1$-$C_4$alcohol, such as methanol, ethanol, n-propanol, isopropanol, n-butanol, sec-butanol, tert-butanol or isobutanol; an amide, e.g. dimethylformamide or dimethyl acetamide; a ketone or ketone alcohol, e.g. acetone, methyl isobutyl ketone, diacetone alcohol; an ether, e.g. tetrahydrofuran or dioxane; a nitrogen-containing heterocyclic compound, e.g. N-methyl-2-pyrrolidone or 1,3-dimethyl-2-imidazolidone; a polyalkylene glycol, preferably a low molecular weight polyethylene glycol having a molecular weight of from 100 to 800, e.g. diethylene glycol, triethylene glycol, tetraethylene glycol, polyethylene glycol 200, polyethylene glycol 300, polyethylene glycol 400 or polyethylene glycol 600, especially having a molecular weight of from 150 to 400, or a low molecular weight polypropylene glycol, e.g. dipropylene glycol, tripropylene glycol, polypropylene glycol P 400 or polypropylene glycol P 425; a $C_1$-$C_4$alkyl ether of a polyalkylene glycol, e.g. diethylene glycol monobutyl ether, 2-(2-methoxyethoxy)ethanol, 2-(2-ethoxyethoxy)ethanol, 2-[2-(2-methoxy-ethoxy)ethoxy]ethanol or 2-[2-(2-ethoxyethoxy)ethoxy]ethanol; a $C_2$-$C_6$alkylene glycol or a thioglycol, e.g. ethylene glycol, propylene glycol, butylene glycol, 1,5-pentanediol, thiodiglycol, hexylene glycol; further a polyol, e.g. glycerol or 1,2,6-hexanetriol; or a $C_1$-$C_4$alkyl ether of a polyhydric alcohol, e.g. 2-methoxyethanol or 1-methoxypropan-2-ol.

More especially, the inks comprise at least one solubiliser or humectant from the group consisting of polyethylene glycols having a molecular weight of from 150 to 400, diethylene glycol monobutyl ether, N-methyl-2-pyrrolidone and glycerol and especially tetraethylene glycol, polyethylene glycol 400, diethylene glycol monobutyl ether and glycerol, usually in an amount of from 2 to 30% by weight, especially from 5 to 25% by weight and more especially from 20 to 25% by weight, based on the total weight of the ink.

The inks may in addition comprise solubilisers, e.g. ε-caprolactam.

As humectants in the inks according to the invention there also come into consideration, for example, urea or a mixture of sodium lactate (advantageously in the form of a 50 to 60% aqueous solution) and glycerol and/or propylene glycol in amounts of preferably from 0.1 to 30% by weight, especially from 2 to 30% by weight.

The inks may comprise thickeners of natural or synthetic origin, inter alia for adjusting the viscosity.

Examples of thickeners that may be mentioned include commercially available alginate thickeners, starch ethers and carob flour ethers, especially sodium alginate on its own or in admixture with modified cellulose, for example methyl, ethyl, carboxymethyl, hydroxyethyl, methylhydroxyethyl, hydroxypropyl or hydroxypropylmethyl cellulose, especially with preferably from 20 to 25 percent by weight of carboxymethyl cellulose. There may furthermore be mentioned as synthetic thickeners, for example, those based on poly(meth)-acrylic acids or poly(meth)acrylamides.

The inks contain such thickeners in an amount of, for example, from 0.01 to 2% by weight, especially from 0.01 to 1% by weight and more especially from 0.01 to 0.5% by weight, based on the total weight of the ink.

The inks may also comprise buffer substances, for example borax, borate, phosphate, polyphosphate or citrate. Examples that may be mentioned are borax, sodium borate, sodium tetraborate, sodium dihydrogen phosphate, disodium hydrogen phosphate, sodium tripolyphosphate, sodium pentapolyphosphate and also sodium citrate. They are used especially in amounts of from 0.1 to 3% by weight, more especially from 0.1 to 1% by weight, based on the total weight of the ink, to establish a pH value of, for example, from 4 to 9, especially from 5 to 8.5.

Further additives that may be present in the inks are surfactants or wetting agents.

Surfactants or wetting agents that come into consideration are the commercially available anionic or non-ionic surfactants.

Furthermore, the inks may in addition comprise customary additives, e.g. anti-foams or especially substances that inhibit fungal and/or bacterial growth. Such additives are usually used in amounts of from 0.01 to 1% by weight, based on the total weight of the ink.

Preservatives that come into consideration are formaldehyde-yielding agents, e.g. paraformaldehyde and trioxane, especially aqueous formaldehyde solutions, for example 30 to 40 percent by weight formaldehyde solutions, imidazole compounds, e.g. 2-(4-thiazolyl)-benzimidazole, thiazole compounds, e.g. 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one.

The inks can be prepared in customary manner by mixing together the individual components, for example in the desired amount of ethanol or water. Suspended matter and insoluble components present in the inks are removed, for example, by filtration through filters having a pore size of from 0.2 to 0.5 μm.

Preference is given to inks having a viscosity of from 1 to 40 mPa·s, especially from 1 to 20 mPa·s and more especially from 1 to 10 mPa·s.

The inks according to the invention are suitable for use in recording systems in which the ink is expressed from a small aperture in the form of droplets and directed onto a planar substrate on which an image is formed. Suitable substrates include, for example, paper, plastics films or textile fibre materials, preferably paper or plastics films and especially a plastics-coated paper. Suitable recording systems include, for example, commercially available ink-jet printers for use in paper printing or textile printing.

As examples of paper that can be printed with the inks according to the invention there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films that can be printed with the inks according to the invention are, for example, transparent or cloudy/opaque. Suitable plastics films are, for example, 3M Transparency Film. Preference is given to glossy paper, such as, for example, Epson Glossy Paper.

As textile fibre materials there come into consideration especially nitrogen-containing or hydroxy group-containing fibre materials, for example woven textile fabric made of cellulose, silk, wool or synthetic polyamides, especially silk.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). For the process according to the invention, printing by means of a piezo ink-jet head is preferred, but preference is given also to printing according to the continuous ink-jet method.

The present invention relates also to the above-mentioned uses of the dyes according to the invention, such as in a method of printing semi-synthetic or synthetic hydrophobic fibre material, especially textile material, which comprises applying the dyes according to the invention to the said material. The mentioned hydrophobic fibre material is preferably textile polyester material.

Further substrates that can be treated by the process according to the invention and also preferred process conditions can be found hereinabove in the more detailed explanation of the use of the dyes according to the invention.

The invention relates also to the hydrophobic fibre material, preferably polyester textile material, paper and plastics films or metal foils, printed using the said process.

The dyes of formula (1) according to the invention are furthermore suitable for other recording methods, for example thermotransfer printing.

The following Examples serve to illustrate the invention. Unless otherwise indicated, parts are parts by weight and percentages are percentages by weight. The temperatures are given in degrees Celsius. The relationship between parts by weight and parts by volume is the same as that between grams and cubic centimetres.

EXAMPLE 1

Diazotisation

In a sulfonating flask, 298.8 g of 2-sulfo-4-nitroaniline sodium/ammonium salt (86%) are stirred into 4800 ml of demineralised water and then 130 ml of hydrochloric acid (37%) are added. Cooling to from 0 to 5° C. is then carried out using an ice bath, and 278.4 ml of 4M sodium nitrite are added over the course of 15 minutes. The mixture is further stirred for one hour. The excess of sodium nitrite is destroyed using 1M aminosulfonic acid. The pH value is then increased to 2.5 using 30% NaOH. A solution of 60 g of resorcinol and 1200 ml of water is added dropwise over the course of 30 minutes, during which the pH value is maintained at about 3. The temperature remains in the region of 5° C. After 25 minutes, the temperature is increased to 10° C. and the pH value to 5. The orange-red suspension is then stirred for about one hour and the diazo excess is, where necessary, broken down using a small amount of resorcinol. The reaction mixture is further stirred for 12 hours at room temperature, and is then filtered off and subsequently washed with 100 ml of 20% sodium chloride solution. The filter cake is then dried in vacuo for 12 hours at 70° C. 315 g of the compound of formula

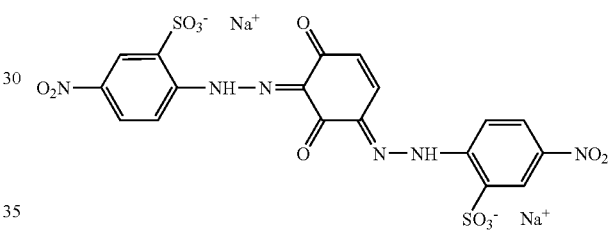

(Ia)

are obtained.

Salt Conversion (0.01 mol)

200 ml of demineralised water are introduced as the initial charge into a 4-necked sulfonating flask and heated to 40° C. 7.36 g of the compound of formula (1a) are added thereto in portions. The suspension is adjusted to pH 7.0 using 1 N sodium hydroxide solution, whereupon it becomes a solution. 300 ml of isobutyl methyl ketone and 7.73 g of tetrabutylammonium bromide (98%) are then added in succession and the mixture is heated to an internal temperature of 68° C. The pH value is then adjusted to 3.5 using formic acid (100%) and subsequently stirred for from 15 to 20 minutes. The organic phase is separated off in a separating funnel and then fully concentrated. 10.4 g (89.5% of theory) of an orange dye of formula

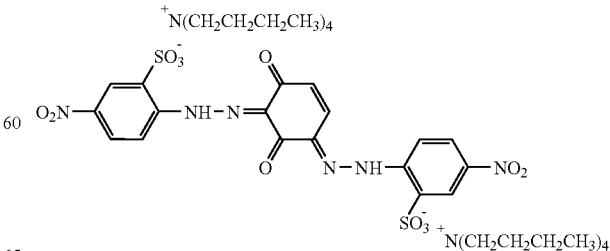

(100)

are obtained.

EXAMPLE 2

In a glass beaker, 52.5 g (81.5%) of 2-sulfo-4-nitroaniline are stirred into 800 ml of demineralised water and then 7 ml of 37% hydrochloric acid are added. Cooling to from 0 to 5° C. is then carried out using an ice bath, and 46.4 ml of 4M sodium nitrite are fed in over the course of 45 minutes with the simultaneous addition of a small amount (about 2 ml) of hydrochloric acid. The mixture is further stirred for 40 minutes. The excess of sodium nitrite is destroyed using 1 M aminosulfonic acid.

Coupling 10.0 g of resorcinol (Fluka purum) are dissolved in 100 ml of demineralised water in a glass beaker. The resulting coupling solution is subsequently added to the ice-cooled diazonium solution over the course of 30 minutes, during which the pH value is maintained at from 2.3 to 3.7 by adding sodium hydrogen carbonate. A thick orange-red suspension is obtained. The pH value is then adjusted to 6.4 using sodium hydrogen carbonate, and diluted with 100 ml of demineralised water. The suspension is further stirred for 150 minutes, and then filtered and subsequently washed with 200 ml of 12% sodium chloride solution. The filter cake is dried in a vacuum cabinet for 12 hours at 70° C. 74 g of a compound of formula (1a) are obtained.

Salt Conversion (0.016 mol)

250 ml of demineralised water are introduced as the initial charge into a 4-necked sulfonating flask and heated to 70° C. 11.0 g of the compound of formula (1a) are added thereto in portions. The suspension is adjusted to pH 7.0 using 1 N sodium hydroxide solution, where-upon it becomes a solution. 150 ml of ethyl acetate and 12.5 g of tetrabutylammonium bromide (98%) are then added in succession and the mixture is heated to an internal temperature of 68° C. The organic phase is separated off in a separating funnel. The aqueous phase is extracted again using 100 ml of ethyl acetate. The organic phases are then fully concentrated. 14.7 g (83% of theory) of an orange dye of formula (100) are obtained.

Dyes of the formulae below are prepared analogously to Examples 1 and 2:

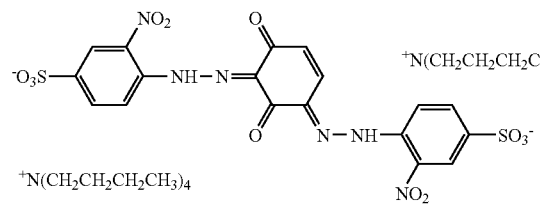
(101)

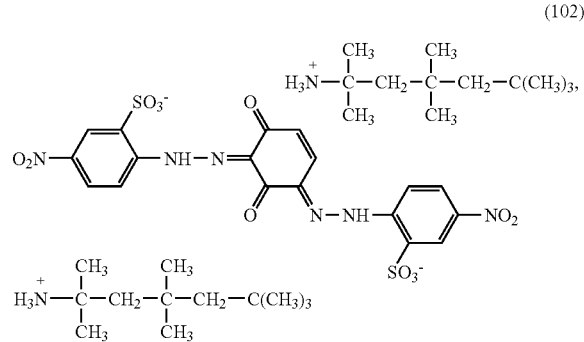
(102)

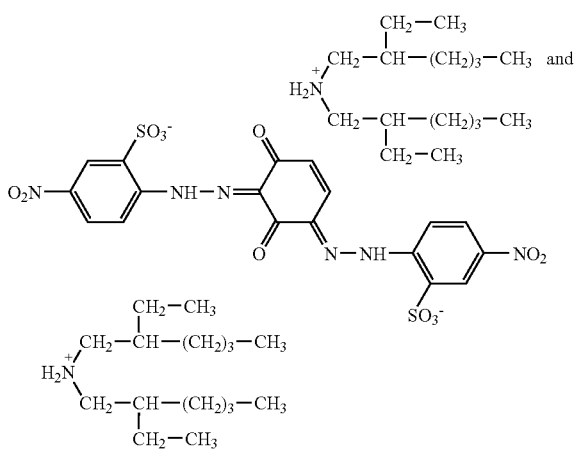
(103)

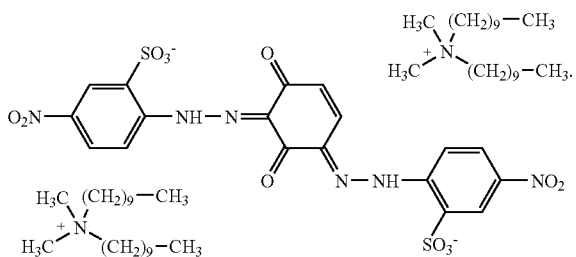
(104)

Example 1 of a Printing Colorant 3.0% by weight of the dye of formula

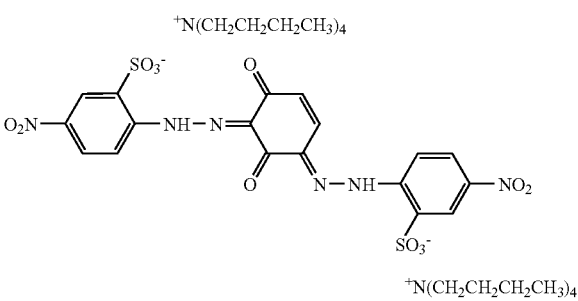
(100)

are stirred into 97.0% by weight of a formulation consisting of 12.0% by weight of NC AH 27 (20% ATBC) [a nitrocellulose, soluble in ethanol, containing 20% by weight of acetyl tributyl citrate], 2.0% by weight of Hercolyn DE [a water-repellent agent], 10.0% by weight of ethoxypropanol, 20.0% by weight of ethyl acetate and 56.0% by weight of ethanol until homogeneous.

The printing colorant gives a brilliant intense reddish yellow coloration on paper, plastics films or metal foils.z Example 2 of a Printing Colorant 3.0% by weight of the dye of formula (100)
are stirred into
97.0% by weight of a formulation consisting of
14.0% by weight of vinylite VYHH (UCC) [a vinyl chloride/vinyl acetate copolymer (85%/15%)],
10.0% by weight of ethoxypropanol and
76.0% by weight of MEK [methyl ethyl ketone] until homogeneous.

The printing colorant gives a brilliant intense reddish yellow coloration on paper, plastics films or metal foils.

Example 3 of a Printing Colorant 3.0% by weight of the dye of formula

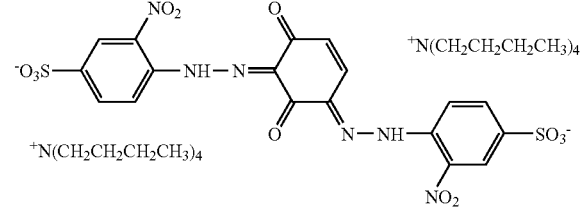

(101)

are stirred into
97.0% by weight of a formulation consisting of
12.0% by weight of NC AH 27 (20% ATBC) [a nitrocellulose, soluble in ethanol, containing 20% by weight of acetyl tributyl citrate],
2.0% by weight of Hercolyn DE [a water-repellent agent],
10.0% by weight of ethoxypropanol,
20.0% by weight of ethyl acetate and
56.0% by weight of ethanol until homogeneous.

The printing colorant gives a brilliant intense reddish yellow coloration on paper, plastics films or metal foils.

Example 4 of a Printing Colorant 3.0% by weight of the dye of formula (100) are stirred into
97.0% by weight of a formulation consisting of
11.0% by weight of nitrocellulose A400,
9.0% by weight of Dowanol PM(A) (methoxypropyl acetate),
20.0% by weight of ethyl acetate and
60.0% by weight of ethyl alcohol until homogeneous.

The printing colorant gives a brilliant intense reddish yellow coloration on paper, plastics films or metal foils.

Example 5 of a Printing Colorant 3.0% by weight of the dye of formula (100) are stirred into
97.0% by weight of a formulation consisting of
6.5% by weight of Movital B20H (a vinyl chloride/vinyl acetate copolymer),
1.5% by weight of Foralyn 5020-F (additive for gloss improvement),
30.0% by weight of ethoxypropanol,
40.0% by weight of Dowanol PMA (methoxypropyl acetate) and
22.0% by weight of diacetone alcohol until homogeneous.

The printing colorant gives a brilliant intense reddish yellow coloration on paper, plastics films or metal foils.

Example of a Solvent-Containing Wood Stain 3.0 parts by weight of the azo dye of formula (100),
40.0 parts by weight of ethyl alcohol,
40.0 parts by weight of 1-methoxy-2-propanol and
17.0 parts by weight of isopropanol The wood stain obtained according to the above Example is applied to a 10×5.5 cm piece of ash wood using a paint brush. The stained piece of wood is dried in air for 12 hours.

What is claimed is:

1. A dye of formula

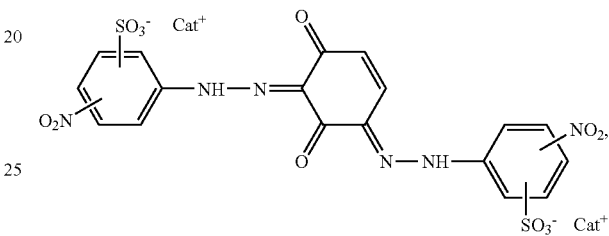

(1)

wherein
Cat$^+$ is an organic cation.

2. A dye according to claim 1, wherein Cat$^+$ is the ammonium cation

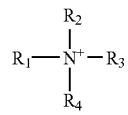

of an amine of formula

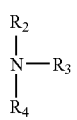

or of an ammonium compound of formula

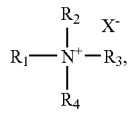

wherein $R_1$, $R_2$, $R_3$ and $R_4$ are each independently of the others hydrogen or linear or branched $C_2$-$C_{14}$alkyl unsubstituted or hydroxy- or amino-substituted, and optionally interrupted by an oxygen atom, at least one of the substituents $R_1$ to $R_4$ being linear or branched $C_2$-$C_{14}$alkyl unsubstituted or hydroxy- or amino-substituted, and optionally interrupted by an oxygen atom, and X is halogen or —OH.

3. A dye according to claim 2, wherein Cat$^+$ is derived from $C_1$-$C_{14}$-tetraalkylammonium hydroxide.

4. A dye according to claim 1 of formula

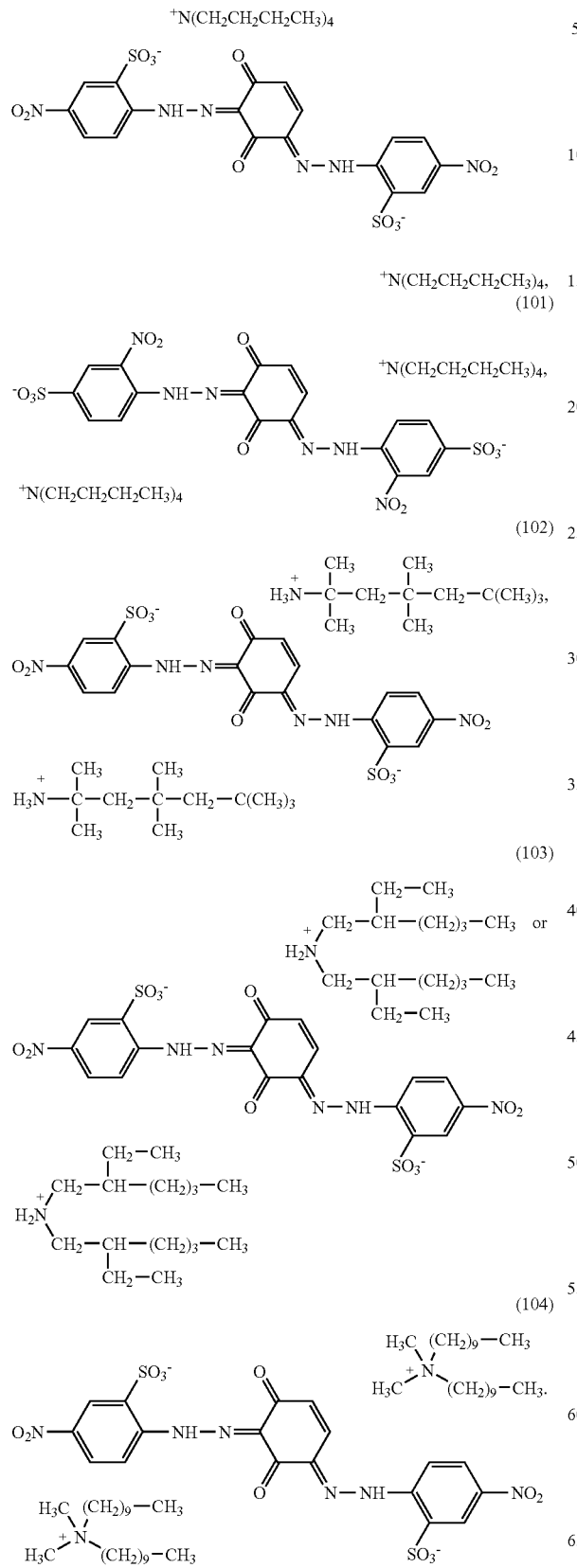

5. A process for the preparation of a dye of formula (1) according to claim 1, which comprises salt conversion of the dye of formula

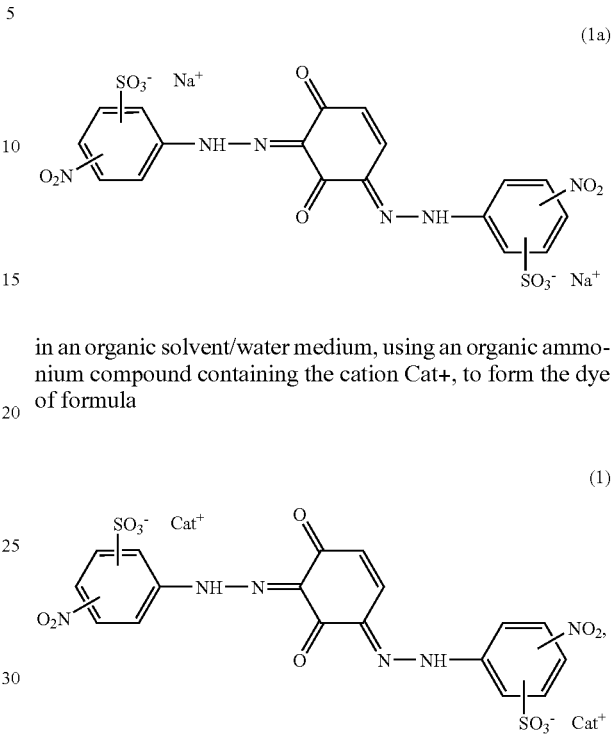

in an organic solvent/water medium, using an organic ammonium compound containing the cation Cat+, to form the dye of formula (1)

wherein $Cat^+$ is an organic cation.

6. A printing colorant comprising a dye of formula (1) according claim 1.

7. A printing paste comprising a dye of formula (1) according to claim 1.

8. A printing ink comprising a dye of formula (1) according to claim 1.

9. A method of dyeing or printing semi-synthetic or synthetic hydrophobic fibre material, which comprises applying to or incorporating in the said material one or more dyes of formula (1) according to claim 1.

10. A method according to claim 9, wherein the semi-synthetic or synthetic hydrophobic fibre material, consists of polyester fibres.

11. A method of colouring or printing paper, plastics films or metal foils, which comprises applying to or incorporating in the said material one or more dyes of formula (1) according to claim 1.

12. The material dyed or printed according to claim 9.

13. A printing ink according to claim 8 which is an ink-jet printing ink.

14. A printing colorant comprising a dye of formula (1) according to claim 2.

15. A printing paste comprising a dye of formula (1) according to claim 2.

16. A printing ink comprising a dye of formula (1) according to claim 2.

17. A method of dyeing or printing semi-synthetic or synthetic hydrophobic fibre material, which comprises applying to or incorporating in the said material one or more dyes of formula (1) according to claim 2.

* * * * *